US012613829B1

(12) United States Patent
Hakkarainen et al.

(10) Patent No.: US 12,613,829 B1
(45) Date of Patent: Apr. 28, 2026

(54) METHOD AND SYSTEM TO UPDATE WEIGHT AND BIAS IN PARTITIONED ON-CHIP MEMORY IN AN INFERENCE ENGINE WITH MULTIPLE PROCESSING TILES

(71) Applicant: Marvell Asia Pte Ltd, Singapore (SG)

(72) Inventors: Harri Hakkarainen, Los Gatos, CA (US); Chia-Hsin Chen, San Jose, CA (US); Derek Jason Chickles, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 662 days.

(21) Appl. No.: 17/988,616

(22) Filed: Nov. 16, 2022

Related U.S. Application Data

(60) Provisional application No. 63/279,984, filed on Nov. 16, 2021.

(51) Int. Cl.
| | |
|---|---|
| *G06F 9/50* | (2006.01) |
| *G06F 12/02* | (2006.01) |
| *G06F 15/78* | (2006.01) |
| *G06N 5/04* | (2023.01) |
| *G06N 20/00* | (2019.01) |
| *G06F 8/41* | (2018.01) |

(52) U.S. Cl.
CPC ........ *G06F 15/7839* (2013.01); *G06F 9/5016* (2013.01); *G06F 12/0238* (2013.01); *G06F 15/785* (2013.01); *G06N 5/04* (2013.01); *G06F 8/453* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,742,138 B1 * | 5/2004 | Gagne ................. | G06F 11/1471 714/E11.122 |
| 2013/0047250 A1 * | 2/2013 | Kothari ..................... | G06F 1/32 726/16 |
| 2016/0041906 A1 * | 2/2016 | Mukherjee .............. | G06F 16/22 |
| 2016/0378377 A1 * | 12/2016 | Hu ......................... | G06F 3/0647 711/162 |
| 2018/0059630 A1 * | 3/2018 | Yang ......................... | G06F 7/08 |
| 2019/0026246 A1 * | 1/2019 | Chen ........................ | G06F 3/061 |
| 2020/0294182 A1 * | 9/2020 | George .............. | G06F 16/1724 |
| 2021/0125104 A1 * | 4/2021 | Christiansen .......... | G06N 20/10 |
| 2022/0051095 A1 * | 2/2022 | Luschi ..................... | G06F 7/22 |

(Continued)

*Primary Examiner* — Abu Zar Ghaffari

(57) ABSTRACT

A system includes a first and a second processing tiles including a first and a second processing elements and on-chip memory (OCMs) respectively. The first and the second OCM are partitioned. A first partition of the first OCM receives and locally stores a first and a second set of data associated with a first operation and a second operations respectively and accessed by the first processing element for processing the first and the second operations. The second OCM receives and locally stores a third set of data associated with a third operation for access by the second processing element for processing the third operation. The first processing tile processes the first operation based on the first set of data as the second processing element is processing the third operation based on the third set of data while a fourth set of data is being received by the first processing tile.

23 Claims, 9 Drawing Sheets

(56)　　　　　　References Cited

U.S. PATENT DOCUMENTS

| | | | |
|---|---|---|---|
| 2022/0067513 A1* | 3/2022 | Stevens | .................. G06N 3/045 |
| 2022/0121914 A1* | 4/2022 | Huang | .................... G06N 3/08 |
| 2022/0147832 A1* | 5/2022 | Huang | .................. G06N 3/045 |
| 2022/0391172 A1* | 12/2022 | Imber | .................... G06N 3/063 |
| 2023/0012553 A1* | 1/2023 | Ahmadi | .................. G06F 17/16 |
| 2023/0048836 A1* | 2/2023 | Itani | .................... G06F 9/30072 |
| 2023/0095535 A1* | 3/2023 | Maiyuran | ................. G06T 1/60 |
| | | | 345/501 |

* cited by examiner

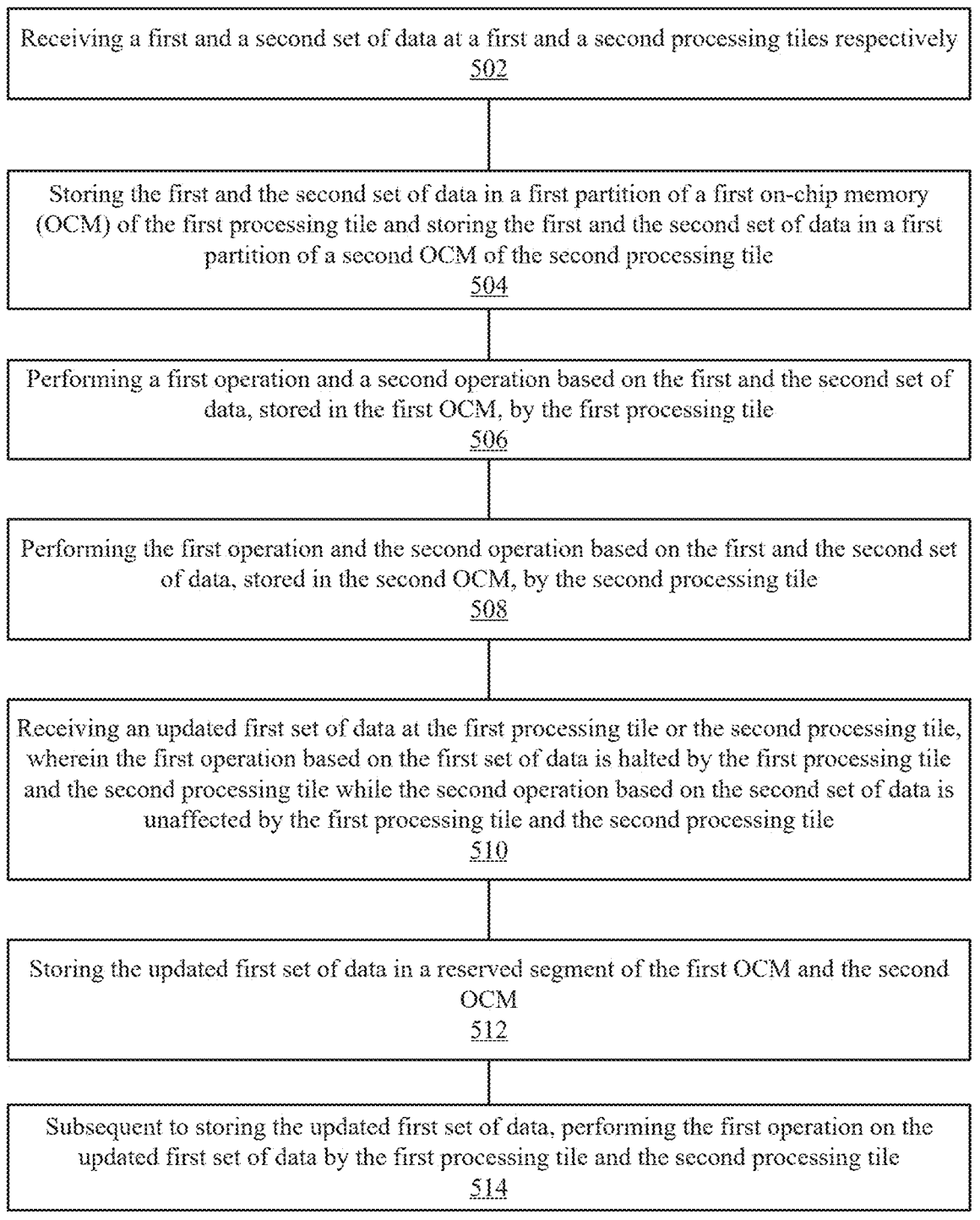

Receiving a first and a second set of data at a first and a second processing tiles respectively
502

Storing the first and the second set of data in a first partition of a first on-chip memory (OCM) of the first processing tile and storing the first and the second set of data in a first partition of a second OCM of the second processing tile
504

Performing a first operation and a second operation based on the first and the second set of data, stored in the first OCM, by the first processing tile
506

Performing the first operation and the second operation based on the first and the second set of data, stored in the second OCM, by the second processing tile
508

Receiving an updated first set of data at the first processing tile or the second processing tile, wherein the first operation based on the first set of data is halted by the first processing tile and the second processing tile while the second operation based on the second set of data is unaffected by the first processing tile and the second processing tile
510

Storing the updated first set of data in a reserved segment of the first OCM and the second OCM
512

Subsequent to storing the updated first set of data, performing the first operation on the updated first set of data by the first processing tile and the second processing tile
514

FIGURE 5

METHOD AND SYSTEM TO UPDATE WEIGHT AND BIAS IN PARTITIONED ON-CHIP MEMORY IN AN INFERENCE ENGINE WITH MULTIPLE PROCESSING TILES

RELATED APPLICATION

This application is a nonprovisional application and claims the benefit and priority to a provisional application No. 63/279,984 filed on Nov. 16, 2021, which is incorporated herein by reference in its entirety.

BACKGROUND

Use and implementations of machine learning (ML) and artificial intelligence (AI) methods on electronic devices has become ubiquitous. The design of a hardware architecture of an electronic device, which can be but is not limited to a processor, a programmable logic, an application specific integrated circuit (ASIC), or a dedicated ML-specific hardware, often processes different ML models.

Data associated with one or more ML models, e.g., the network tensor weight, the network tensor bias constants, the network tensor input and output for each network layer, etc., may be transmitted by an application (e.g., a neural network) outside of an ML hardware to a specific number of processing tiles of the ML hardware (e.g., an inference engine) that process the one or more ML models. It is appreciated that each processing tile of the inference engine has one or more processing unit (e.g., POD and/or PE) and on-chip memory (OCM).

Unfortunately, transmitting data, e.g., tensor data, from outside of the inference engine, e.g., a double data rate (DDR) memory, to the inference engine has significant impact on performance due to latency and/or throughput. However, data access to a local memory component, e.g., OCM within a given processing tile, may have a higher bandwidth and a lower latency in comparison to accessing data from a component outside of the inference engine. As such, tensor data associated with different ML models may be transmitted to an OCM of a processing tile for local storage in order to reduce the latencies and for ready access when processing the one or more ML models.

However, the operation of the inference engine may be delayed, at runtime, when one or more of the ML models is being updated or when a new ML model, e.g., tensor data, is being transmitted to an OCM for local storage. In other words, the operation of the inference engine is delayed, at run time, as the list of active ML models change over time, or as ML models are updated over time, or as old and/or unused ML models are removed from the OCM. As such, the inference engine is unable to seamlessly update, add, or remove ML models without delaying its operation, at run-time.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 depicts a flowchart of an example of a process for updating or receiving new data associated with a new ML model in an ML hardware with reduced delay to its operation according to one aspect of the present embodiments.

DETAILED DESCRIPTION

Figure 1:
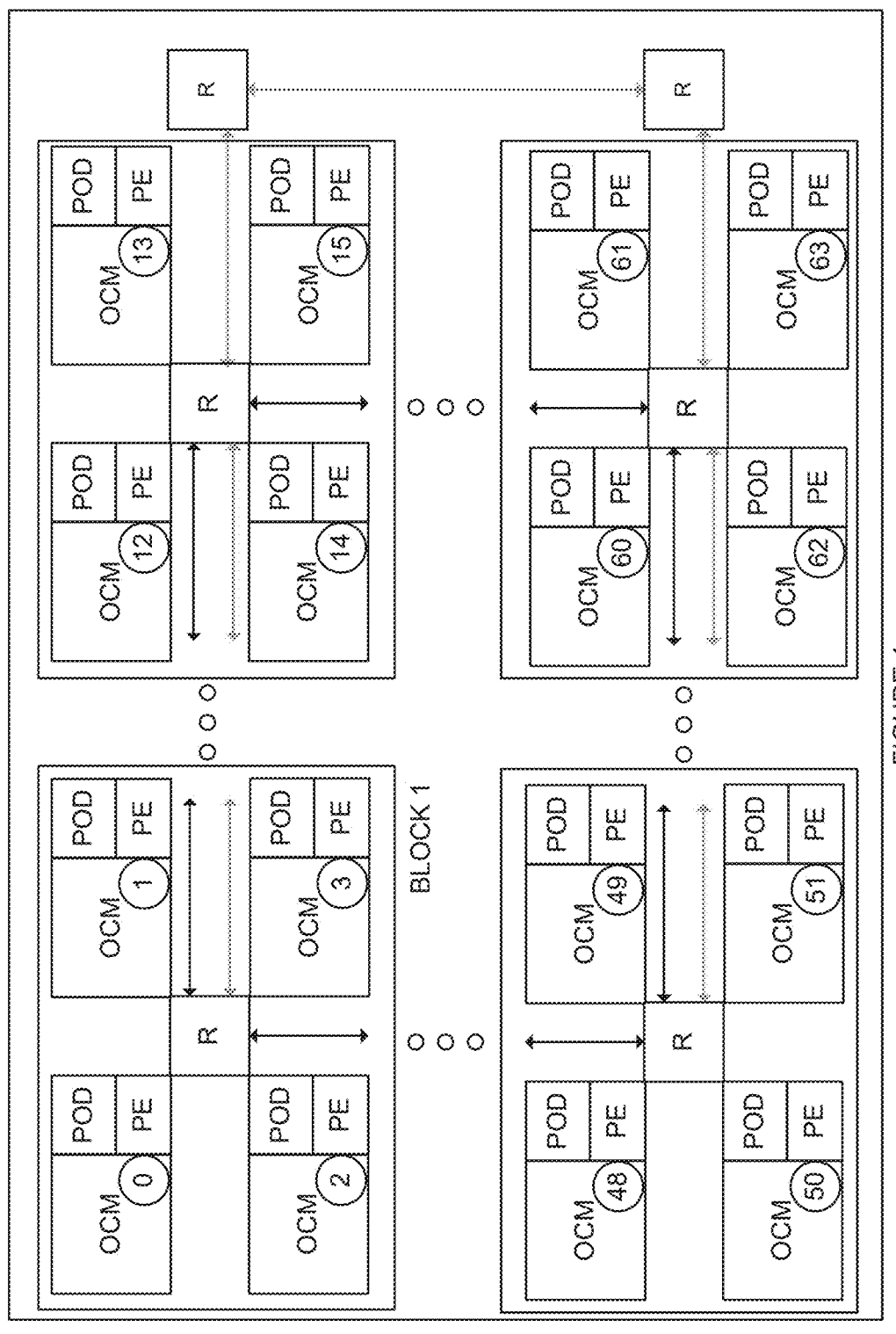
FIG. 1 depicts an example of a diagram of an ML hardware according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

One or more ML models may be used by an ML hardware (e.g., an accelerator or an inference engine) having a plurality of processing tiles for inference purposes. It is appreciated that use of a plurality of processing tiles enables data to be processed in a much faster fashion in comparison to the sequential processing of a single processing element, thereby improving the processing speed. It is appreciated that typically the same ML hardware is used for various processing needs and as such it is desirable to enable the ML hardware to seamlessly switch between different ML models without delaying the activity of the ML hardware. Moreover, it is appreciated that tensor data, e.g., weight, constant, etc., associated with different ML models may be transmitted from a component, e.g., DDR, host, etc., external to the ML hardware to the OCMs, e.g., SRAM, of the ML hardware for local storage in order to reduce latencies associated with data movement during runtime.

However, the operation of the ML hardware may be delayed, during runtime, if data associated with a new ML model is transmitted, from a component external to the ML hardware, to the ML hardware or if data associated with an ML model that is already stored in an OCM of a processing tile of the ML hardware is to be updated or if data associated with an old ML model stored in an OCM of a processing tile of the ML hardware is to be removed.

As such, a new approach is proposed to reduce delay associated with activities of the ML hardware, at runtime, when data associated with a new ML model is being transmitted, from a component external to the ML hardware, to the ML hardware or when data associated with an already stored ML model in the ML hardware is being updated or when data associated with an already stored ML model in the ML hardware is being removed. In some embodiments, the OCM associated with a processing tile may be partitioned. At least one partition of the OCM may be configured to store data associated with different ML models. For example, one partition of the OCM may be configured to store data, e.g., weight, constant, etc., associated with different ML models (as a nonlimiting example 7 ML models). The partition of the OCM that is configured to store data associated with different ML models may be segmented such that each segment stores data associated with one ML model. It is appreciated that at least one segment of the partition that is configured to store data associated with different ML models may be reserved for receiving data associated with new ML model and/or updated data associated with an ML model that is already stored in another segment of the partition within the OCM.

During runtime and processing of different ML models, the processing tile inactivates the processing of an outdated data associated with an already stored ML Model in the OCM when an updated data (associated with the ML model) is being received at the reserved segment of the OCM. However, other segments of the OCM that store data associated with other ML models remain active and therefore the operation of the processing tile within the ML hardware with respect to the other ML models remains unaffected. Once the storing of the updated data is complete (i.e., ML model is updated), the reserved segment becomes active enabling the processing tile to also operate on the updated ML model. In some embodiments, the old data associated with the outdate ML model is purged and the segment is designated as a reserved segment, enabling new ML models to be received and/or other outdated data associated with other ML models to be updated similar to the process described above.

It is appreciated that each processing tile with an OCM may also include a sideband interface, e.g., register, memory component, memory read/write port, etc. The sideband interface may receive data associated with the ML model being updated and/or new data associated with a new ML model from a component external to the ML hardware, e.g., DDR, host, etc. The sideband interface operates independent of the processing elements and the OCM of its designated processing tile. As such, while the processing tile is processing the data associated with the ML models, e.g., models A-G, that are already stored in the OCM, the sideband interface may receive updated data for an already stored ML model, e.g., for ML model A, or new data associated with a new ML model, e.g., model H. Thus, the sideband interface receives data as the processing tile continues operating on various ML models simultaneously. For a non-limiting example, there may be an overlap of time during which data is being received by the sideband interface and during which the processing tile is operating on an ML model. In some embodiments, the overlap may be a complete overlap between when the data is being received by the sideband interface and the processing tile operating on an ML model (e.g., during the entire time that data is being received by the sideband interface the processing tile is operating on various ML models, or during the entire that the processing is operating on various ML models the data is being received by the sideband interface) or it may be a partial overlap between the two (e.g., data is being received by the sideband interface while the processing tile is idle after which the sideband interface is still receiving data but the processing tile operates on various ML model, or the processing tile is operating on various ML models while the sideband interface is initially not receiving data but after which the sideband interface receives data as the processing tile continues operating on various ML models). It is appreciated that ML models may each include one or more operations. Once the transfer of data to the sideband interface is complete, then the sideband register may transfer the data to the reserved segment of the partition of the OCM The processing tile may activate the reserved segment as a new ML model or as the updated ML model and purge the data from the segment with outdated data. The segment where data was purged from may be designated as the reserved segment configured to receive further data updates and/or data associated with new ML models.

For a non-limiting example, the inference engine may include 64 processing tiles (each processing tile may further include a plurality of smaller processing elements PE and POD that are described in the U.S. patent application Ser. No. 16/226,508, filed Dec. 19, 2018 that is incorporated herein by reference in its entirety). Each of those processing tiles is configured to receive a sub-vector and an instruction (i.e., compiled SoftMax instructions, ArgMax instruction, TopK, GEMM, SUM, MUL, etc.). As such, multiple sub-vectors may be operated on simultaneously, thereby reducing the processing time. For illustrative purposes, it is assumed that there are 64 processing tiles where each processing element is configured to process 64 elements. However, it is appreciated that any number of processing tiles may be used.

The proposed ML hardware architecture is highly efficient, flexible and optimized for high-efficiency ML computing while it reduces overhead and latencies. By providing hardware support to streamline data/instruction flow, the proposed ML hardware architecture improves system-level performance by significantly reducing the hardware overhead involved in moving data and/or instruction in existing computing architectures. The proposed ML hardware architecture works well with existing software frameworks and code and may be applied to a wide variety of ML algorithms and neural networks including, but not limited to, convolution neural network (CNN), recurrent neural network (RNN), gradient boosting machine (GBM), generative adversarial neural network, decision trees, random forest, support vector machine (SVM), clustering, Markov random field (MRF), etc.

It is appreciated that the embodiments are described with respect to weight and bias constant data associated with ML models for illustrative purposes. However, it is appreciated that the embodiments are not limited thereto. For example, a similar approach may be applied to store data locally and to update them using the process above in order to reduce latency and delay to activities of the ML hardware.

In the example of FIG. 1, the ML-specific hardware 100 is a dedicated hardware, including one or more processors and/or OCM units storing the data and/or the set of low-level instructions compiled from the high-level code by the compiler to perform one or more ML operations, e.g., SoftMax operation, ArgMax operation, TopK operation, scatter-gather operation, etc. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks. It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

At runtime, the ML-specific hardware 100 is configured to retrieve the set of low-level instructions and/or data from the compiler and execute the set of low-level instructions to perform the one or more ML operations according to the set of low-level instructions. For a non-limiting example, the ML-specific hardware 100 can be, but is not limited to, an inference engine, which is configured to infer and identify a subject via an inference operation from data input according to the ML network model. FIG. 1 depicts a non-limiting example of an inference engine that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one OCM, a first type of processing unit (POD), and a second type of processing unit (PE). Both types of processing units can execute and be programmed by some of the plurality of low-level instructions received from the compiler. In some embodiments, a plurality of processing tiles forms a processing block, e.g., tiles 0-3 forms processing block 1, and the processing tiles within each processing block are coupled to one another via a routing element, e.g., tiles 0-3 are coupled to one another via routing element R to form processing block 1. It is appreciated that the ML-specific hardware 100 is provided for illustrative purposes and should not be construed as limiting the scope of the embodiments.

Figure 2:
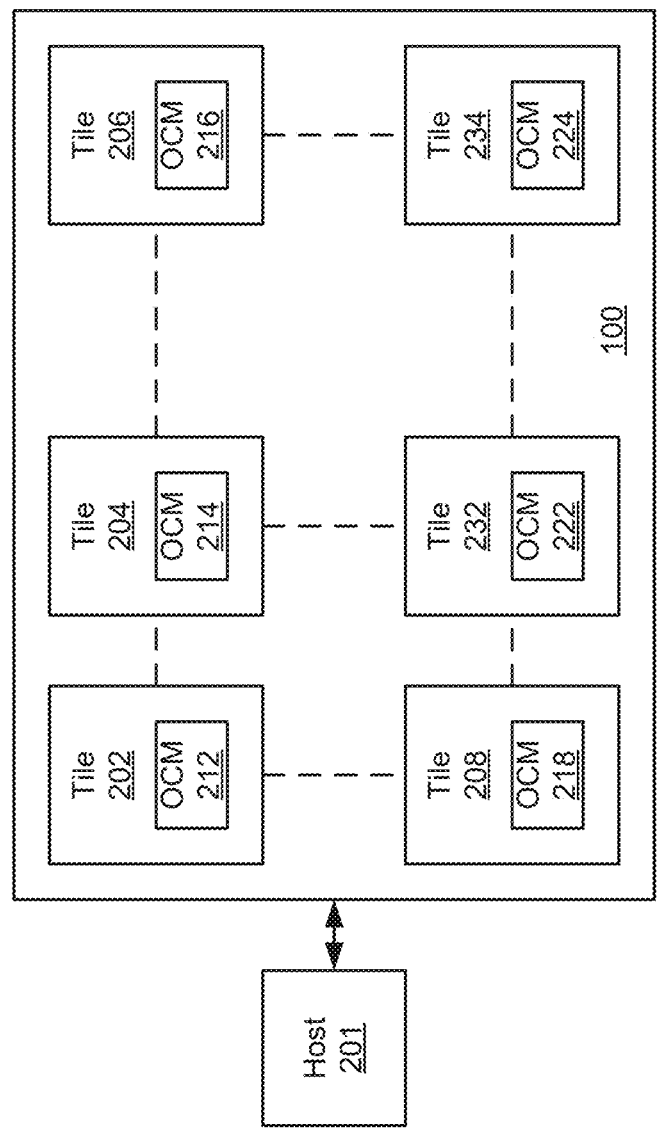
FIG. 2 depicts an example of an ML hardware processing different ML models according to one aspect of the present embodiments.

As shown by the example of FIG. 2, an application (not shown) may run on a host 201, e.g., a central processing unit (CPU), a core, etc., where the host 201 is configured to accept a high-level code of an application (e.g., an ML operation or ML model) and to compile the high-level code into low-level instructions to be executed and/or data to be stored on the ML hardware 100, as described in FIG. 1. It is appreciated that the ML hardware 100 in FIG. 2 includes processing tiles 202, 204, 206, 208, 232, . . . , 234 where each includes its dedicated processing element (POD and PE that are not shown in FIG. 2) and their respective OCMs 212, 214, 216, 218, 222, . . . , 224. It is appreciated that the functionality of the processing tiles and their respective OCM is described in FIG. 1. It is appreciated that the ML hardware 100 is provided for illustrative purposes and should not be construed as limiting the scope of the embodiments. For example, any type of hardware-based system configured to execute low-level instructions may be used.

Here, the high-level code of the application is a software code written through a commonly-used high-level programming language. For a non-limiting example, the high-level functions of the application or ML operation or ML model can generate tensor data, e.g., weight, bias constant, etc., that remains unchanged for a given ML model until that ML model is updated. For example, the application may generate weights and bias constant data for ML models A, B, C, D, . . . , N and B1, C1, D1 . . . . Ni. The ML hardware 100 having to access the weights and bias constants from a component external to the ML hardware 100, e.g., DDR, host 201, etc., every time that an ML model is needed is inefficient and results in large latencies. As such, since the weights and bias constants remain unchanged until the ML model is updated, the weights and bias constants may be transmitted from outside of the ML hardware 100 to the ML hardware 100 for local storage in order to reduce the latency.

For a non-limiting example, an application running on the host 201 may generate the set of low-level instructions that includes one or more of loading data, e.g., weights and bias constant data for ML models A, B, C, D, . . . , N, B1, C1, D1, . . . , Ni, into a memory (e.g., OCM) of the ML hardware 100. It is appreciated that the processing tiles in the ML hardware 100 may be grouped such that a particular group performs operations with respect to a certain ML models while another group performs operations with respect to another set of ML models. For example, processing tiles 202 and 204 may be grouped and be associated with ML models A, B, C, D . . . , N (meaning that each processing tile runs ML models A, B, C, D, . . . , N) while the processing tile 214 may be associated with ML models, A, B1, C1, D1, . . . , Ni. It is appreciated that other processing tiles 206, 208, 232, . . . , may similarly be associated with a number of ML models. As such, grouping the processing tiles 202 and 204 to be associated with ML models A, B, C, D, . . . , N and processing tile 234 to be associated with ML models, A, B1, C1, D1 . . . , Ni is for illustrative purposes only and should not be construed as limiting the scope of the embodiments. For example, in some embodiments, all processing tiles within the ML hardware 100 may be associated with the same ML models, i.e., processing tiles 202, 204, 206, 208, 232, . . . , 234 be associated with ML models A, B, C, D, . . . , N.

As described above, in order to reduce latency, the weight and bias constant data associated with each ML model may be transmitted from the host 201 or another component external to the ML hardware 100, e.g., a DDR, to an OCM of the processing tile. In this nonlimiting example, the weight and bias constant data associated with ML models A, B, C, D, . . . , N is transmitted for storage to OCM 212 of the processing tile 202. Similarly, the weight and bias constant data associated with ML models A, B, C, D, . . . , N is transmitted for storage to OCM 214 of the processing tile 204. Moreover, the weight and bias constant data associated with ML models A, B1, C1, D1, . . . . Ni is transmitted for storage to OCM 224 of the processing tile 234.

In some nonlimiting examples, the compiler (not shown) or the application running on the host 201 may determine the manner of which to reserve DDR (external to the ML hardware 100) and/or OCM memory regions for full or partial tensors to avoid read write data hazards (i.e., data corruption due to unintentional address reuse for optimization that has reused addresses), manner by which perform serialization, and manner by which to reduce data movement, etc. It is also appreciated that in some embodiments, the compiler or the application running on the host 201 may determine the manner of which to reserve DDR and/or OCM memory regions for full or partial tensors, to perform serialization and to reduce data movement.

In the example of FIG. 2, the ML hardware 100 is a dedicated hardware block/component including one or more microprocessors and/or OCM units storing the data and/or the set of low-level instructions compiled from the high-level code performing one or more ML operations. For a non-limiting example, the ML hardware 100 can be but is not limited to an inference engine, which is configured to infer and identify a subject for the application via inference from trained data. At runtime, the ML hardware 100 is configured to retrieve the set of low-level instructions and/or data received from the compiler or the application running on the host 201 and execute the set of low-level instructions to perform the high-level application/ML operation according to the set of low-level instructions.

Figure 3A:
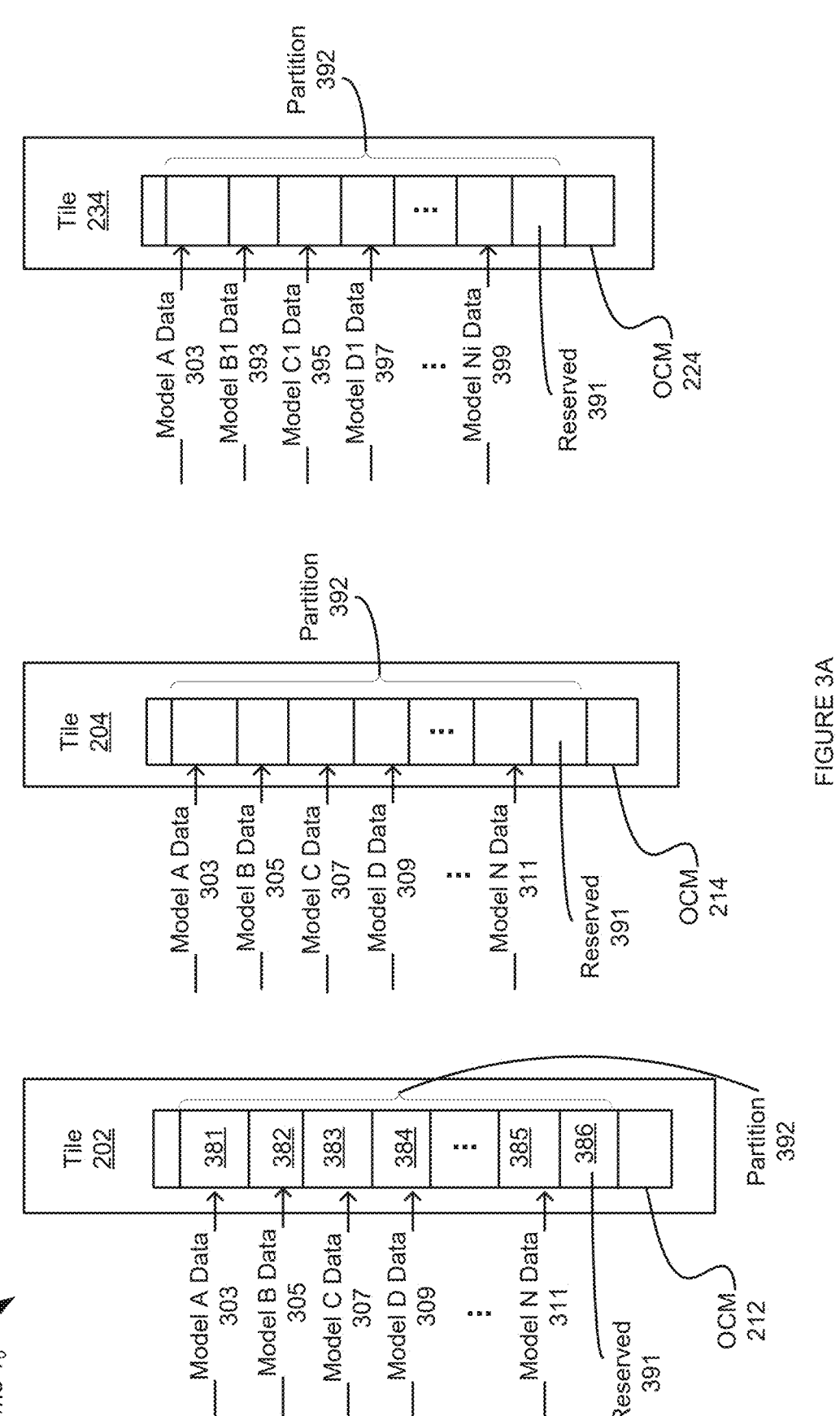
FIG. 3A depicts an example of loading data associated with different ML models into the OCMs of the ML hardware according to one aspect of the present embodiments.

Referring now to FIG. 3A, an example of loading data associated with different ML models into the OCMs of the ML hardware according to one aspect of the present embodiments is shown. At time To, certain data, e.g., weights and bias constant data, associated with ML models may be transmitted, from a component outside of the ML hardware 100, to the OCM of a designated processing tile. For example, as described above, ML models A, B, C, D, . . . , N may be associated with the processing tiles 202 and 204 for illustrative purposes while ML models A, B1, C1, D1, . . . , Ni may be associated with the processing tile 234. The OCM in each processing tile may be partitioned where at least one partition 392 is designated to store the data, e.g., weight and bias constant of ML models. For example, OCM 212 may include a partition 392. Similarly, the OCM 214 and 224 may include their respective partition 392. It is appreciated that the size of the partition in each OCM may be the same (as illustrated) or they may be different. For example, the size of the partition in OCM 224 may be different from the size of the partition in OCM 212. It is appreciated that the OCM may be partitioned and controlled by the application running on the host 201 and/or by the low-level instructions (as compiled by the host 201) and running on one or more processing elements (e.g., POD, PE, etc.) within each processing tile.

In some nonlimiting examples, each partition of the OCM may be segmented such that each segment is associated with one ML model. For example, the partition 392 of the OCM 212 may be segmented into segments 381, 382, 383, 384, . . . , 385, 386. The segment 381 may be designated to store weight and bias constant data associated with ML model A. The segment 382 may be designated to store weight and bias constant data associated with ML model B. The segment 383 may be designated to store weight and bias constant data associated with ML model C. The segment 384 may be designated to store weight and bias constant data associated with ML model D. The segment 385 may be designated to store weight and bias constant data associated with ML model N. The segment 386 may be reserved to update an outdated ML model or to receive a new ML model data (which will be described later). Similarly, the partition 392 of the OCM 214 and 224 may be segmented similar to that of OCM 212. It is appreciated that the number of segments within each partition of the OCM is shown to be the same for illustrative purposes but it is appreciated that the embodiments should not be construed as limited thereto. For example, the number of segments in one OCM may be different from the number of segments in another OCM of the ML hardware 100.

In this nonlimiting example, the segment 381 of OCM 212 receives model A data 303, e.g., weight and bias constant data. Similarly, segment 382 of OCM 212 receives model B data 305. Similarly, segment 383 of OCM 212 receives model C data 307. Similarly, segment 384 of OCM 212 receives model D data 309. Similarly, segment 385 of OCM 212 receives model N data 311. It is appreciated that other segments within the partition 392 of the OCM 212 may receive data associated with other ML models. As described above the segment 386 of partition 392 of the OCM 212 may be reserved 391 for any updates to an already stored ML model data or to receive new ML model data (described later in detail).

In this nonlimiting example, the segments within the partition 392 of OCM 214 receive model A data 303, model B data 305, model C data 307, model D data 309, . . . model N data 311 similar to that of OCM 212. It is appreciated that the OCM 214 also includes a segment that is reserved 391 similar to OCM 212. Similarly, the segments within the partition 392 of OCM 224 of processing tile 234 receive model A data 303, model B1 data 393, model C1 data 395, model D1 data 397, . . . , model Ni data 399. It is appreciated that the OCM 224 also includes a segment that is reserved 391 similar to that of OCM 212.

It is appreciated that only three processing tiles of the ML hardware 100 is described for illustrative purposes but the embodiments should not be construed as limited thereto. For example, other processing tiles may similarly store ML model data (whether for the same model or different models) or the processing tiles may perform other operations.

Figure 3B:
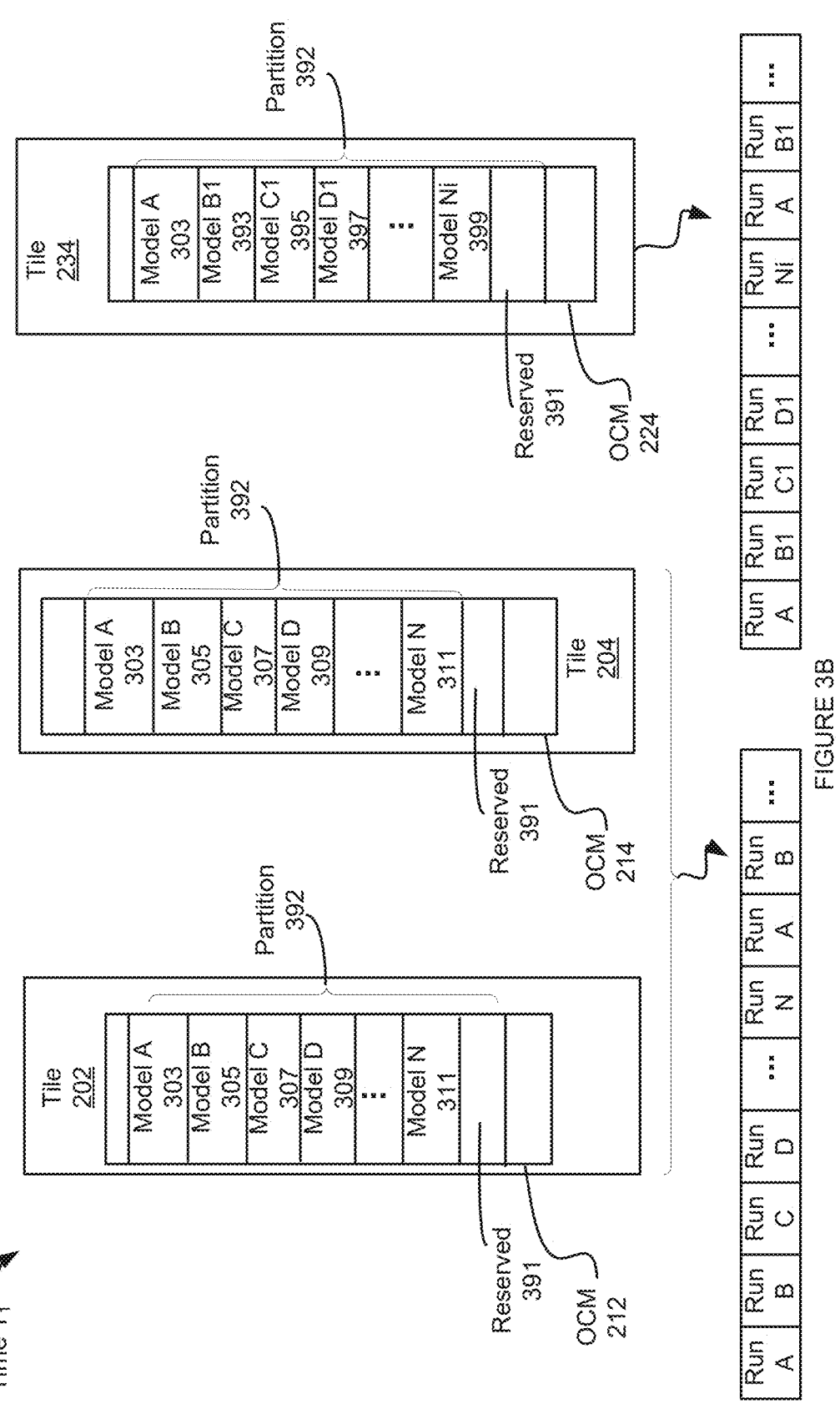
FIG. 3B depicts an example of an ML hardware operating on different ML models data stored in its OCMs according to one aspect of the present embodiments.

Referring now to FIG. 3B, an example of an ML hardware operating on different ML models data stored in its OCMs according to one aspect of the present embodiments is depicted. In this nonlimiting example, at time $T_1$, the ML model data that were transmitted (as shown in FIG. 3A) are stored in their respective segments within the partition of each OCM. Accordingly, each processing tile 202 and 204 performs operations related to its ML models. In other words, the processing tile 202 may locally access OCM 212 to access the model A data 303 to run ML model A, access the model B data 305 to run ML model B, access the model C data 307 to run ML model C, access model D data 309 to run ML model D, . . . , access model N data 311 to run ML model N and to repeat the process. The processing tile 204 also operates similar to the processing tile 202 since the processing tile 204 also stores the same ML data associated with the same ML models as that of the processing tile 202. In contrast, the processing tile 234 performs operations related to its ML models, e.g., ML models A, B1, C1, D1, . . . , Ni. In other words, the processing tile 234 may locally access OCM 224 to access the model A data 303 to run ML model A, access the model B1 data 393 to run ML model B1, access the model C1 data 395 to run ML model C1, access model D1 data 397 to run ML model D1, . . . , access model Ni data 399 to run ML model Ni and to repeat the process.

Figure 3C:
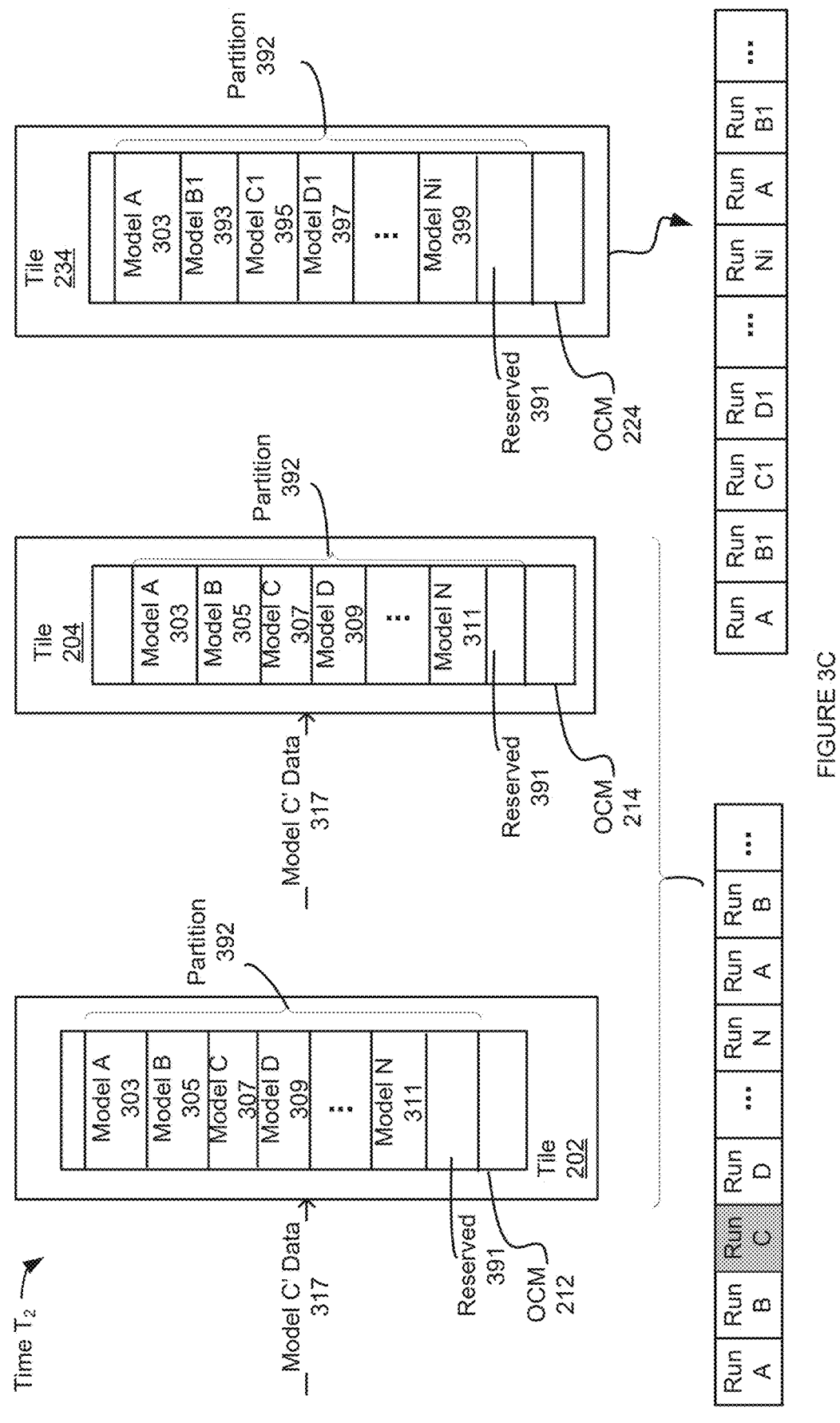
FIG. 3C depicts an example of an ML hardware receiving an updated data for an ML model according to one aspect of the present embodiments.

At time $T_2$, as illustrated in FIG. 3C, updated data, e.g., model C' data 317, for model C is being provided, e.g., by an application running on the host 201. Traditionally, providing an update or a new ML model data caused the operation of the ML hardware to be delayed, e.g., stopping inference during runtime, resulting in excessive latencies. However, the new approach enables the segment associated with model C 307 data to be deactivated and as such while the operation with respect to model C is halted operations with respect to other models A, B, D . . . , N for processing tiles 202 and 204 and operations with respect to models A, B1, C1, D1, . . . , Ni for the processing tile 234 continue. In other words, the processing tiles 202 and 204 are controlled to stop their respective operation for model C (because data such as weight and bias constant) is being updated while continuing their respective operations for other models, e.g., models A, B, D . . . , N, and while the processing tile 234 continues its operations on models A, B1, C1, D1, . . . , Ni because no model is being updated for the processing tile 234.

Figure 3D:
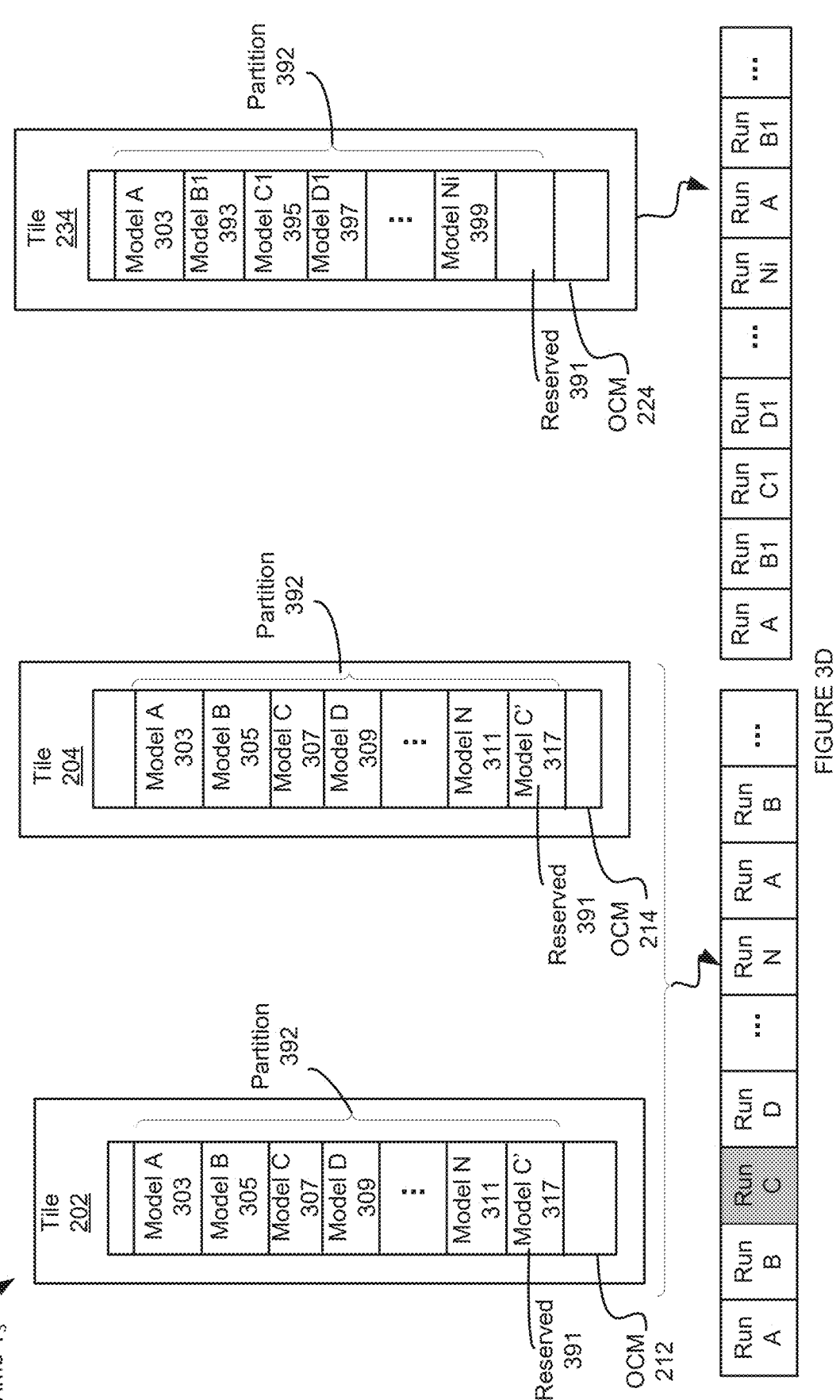
FIG. 3D depicts an example of an ML hardware storing the updated data for an ML model according to one aspect of the present embodiments.

Referring now to FIG. 3D, at time $T_3$, the updated data for model C' data 317 is stored in the reserved 391 segment of the partition 392 for OCM 212. Similarly, at time $T_3$, the updated data for model C' data 317 is stored in the reserved 391 segment of the partition 392 for OCM 214. It is noteworthy that while data model C' data 317 is being received the operation of the processing tiles 202 and 204 is not halted with respect to other ML models, as illustrated. Similarly, the operation of the processing tile 234 is unaffected.

Figure 3E:
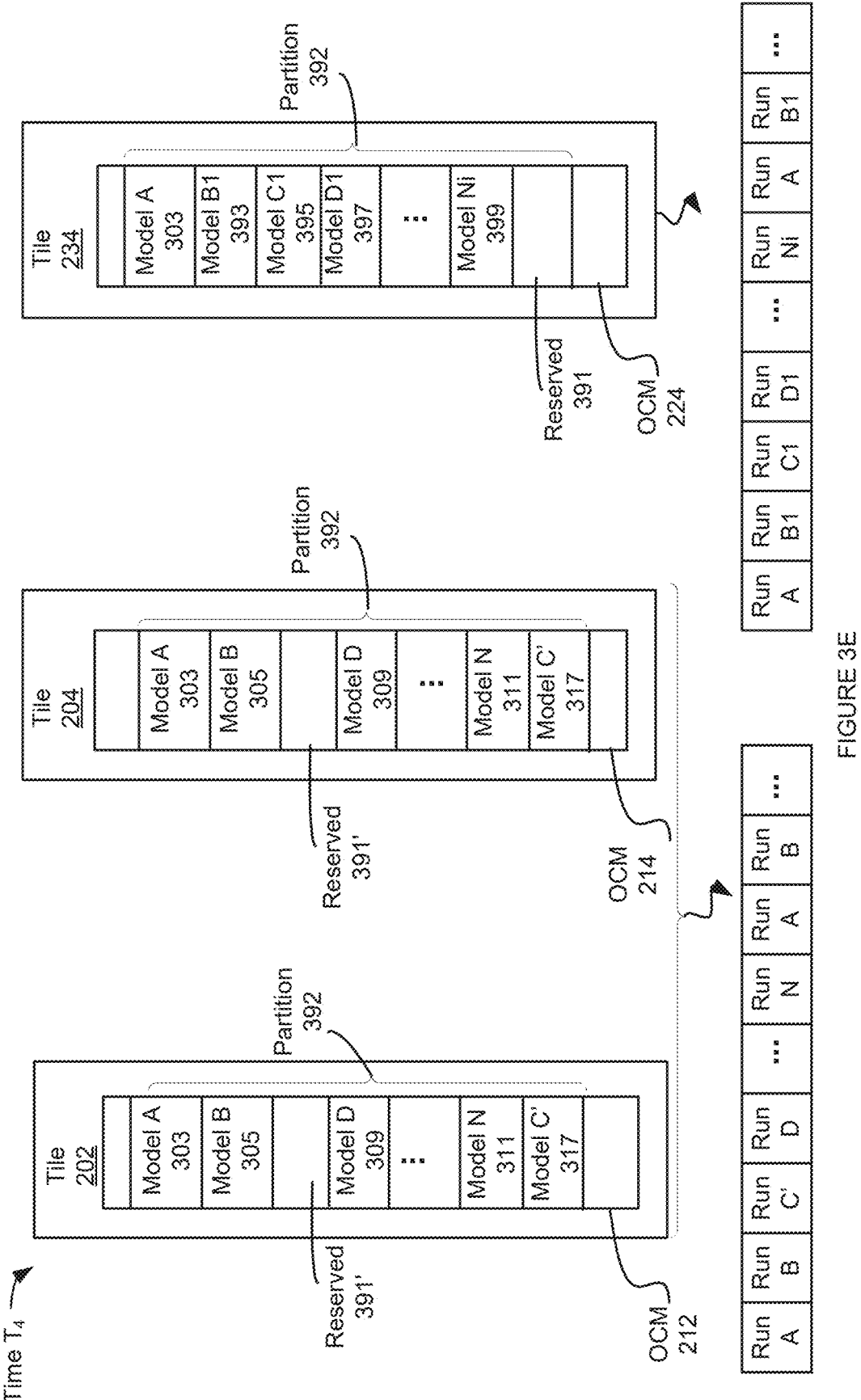
FIG. 3E depicts an example of an ML hardware activating the updated data for an ML model according to one aspect of the present embodiments.

Referring now to FIG. 3E, at time $T_4$, after the data for model C' data 317 (that is the update for model C) is stored in the reserved 391 segment of OCM 212 and 214, the outdated data (i.e., model C 307 data) that were stored in segment 383 are purged and the segment is now designated as a reserved segment 391'. The new reserved segment 391' may be used to update other models at a later time or to receive a new ML model data. It is appreciated that one segment of the partition in an OCM that stores an ML model may be purged if a new ML model is received and if no other segments are available for future data updates or new ML models. Since model C is now updated, the segment holding data associated with model C' data 317 is activated and pulled into operations of the processing tiles 202 and 204. For example, processing tile 202 may now locally access OCM 212 to access the model A data 303 to run ML model A, access the model B data 305 to run ML model C' data 317 to run ML model C', access model D data 309 to run ML model D, . . . , access model N data 311 to run ML model N and to repeat the process. The processing tile 204 also operates similar to the processing tile 202 since the processing tile 204 also stores the same ML data associated with the same ML models as that of the processing tile 202.

Figure 4:
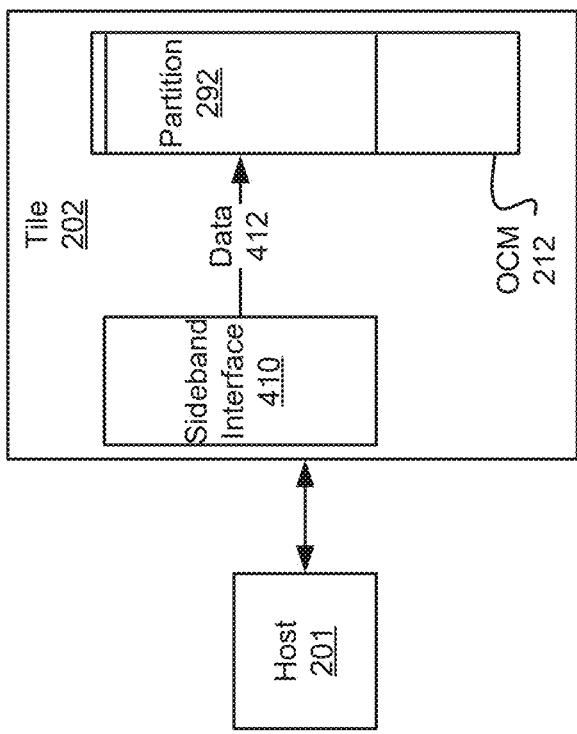
FIG. 4 depicts an example of a system including a processing tile of an ML hardware including a sideband interface according to one aspect of the present embodiments.

FIG. 4 depicts an example of a system including a processing tile of an ML hardware including a sideband interface according to one aspect of the present embodiments. It is appreciated that each processing tile may include its respective sideband interface 410, e.g., memory, register, etc., configured to receive data, e.g., weigh and bias constant data, that is external to the processing tile. For example, in the sideband interface 410 may be configured to receive the model C' data 317 (as described above) or it may be configured to receive data associated with new ML model. In some embodiments, the sideband interface 410 may receive the data first before storing it in its respective OCM, here OCM 212. In one nonlimiting example, transmitting the updated data or new ML model data to the sideband interface 410 enables writing 64 bytes per cycle into the respective OCM whereas writing directly from a component external to the ML hardware 100 into the OCM without using the sideband interface 410 may achieve 8 bytes per cycle. It is appreciated that each processing tile may have its own respective sideband interface. In other words, each sideband interface of a given processing tile may update that ML data for its respective OCM or it may store new ML data for its respective OCM independent of other processing tiles. For example, the sideband 410 of the processing tile 202 may update the ML model and/or store new ML model into the OCM 212 independent of other processing tiles and their respective OCMs It is appreciated that in some embodiments, one processing tile may be designated to receive updated ML data and/or new ML data model and to store that in other processing tiles. In other words, one processing tile may be designated to function as the sideband interface.

As illustrated, any update to an ML model data or new ML model data can be stored locally in an OCM of a given processing tile with reduced delay to the activity of the ML hardware, e.g., activity of one or more processing tiles. It is further appreciated that the OCMs of the processing tiles may include multiple read/write ports as well as multiple banks and as long as access to the same bank is limited to one then there is no delay to the operation of the ML hardware. If more than one access to the same bank is being requested, then the delay is only for the time that the bank is being accessed by an access request before it is released to be accessed by another request.

FIG. 5 depicts a flowchart of an example of a process for updating or receiving new data associated with a new ML model in an ML hardware with reduced delay to its operation according to one aspect of the present embodiments. At step 502, a first and a second set of data are received at a first and a second processing tiles respectively. At step 504, the first and the second set of data are stored in a first partition of a first on-chip memory (OCM) of the first processing tile and the first and the second set of data are stored in a first partition of a second OCM of the second processing tile. At step 506, a first operation and a second operation are performed based on the first and the second set of data, stored in the first OCM, by the first processing tile. At step 508, the first operation and the second operation are performed based on the first and the second set of data, stored in the second OCM, by the second processing tile. In some optional embodiment the first set of data and a third set of data is received at a third processing tile and stored in a first partition of a third OCM of the third processing tile (prior to step 510 below). Optionally the first operation and a third operation are performed by the third processing tile based on accessing the first and the third set of data stored in the third OCM (prior to step 510 below). At step 510, an updated first set of data is received at the first processing tile or the second processing tile. The first operation based on the first set of data is halted by the first processing tile and the second processing tile while the second operation based on the second set of data is unaffected by the first processing tile and the second processing tile. Optionally, the updated first set of data is received by the third processing tile and the first operation based on the first set of data is halted by the third processing tile. At step 512, the updated first set of data is stored in a reserved segment of the first OCM and the second OCM. At step 514, subsequent to storing the updated first set of data, the first operation is performed on the updated first set of data by the first processing tile and the second processing tile. Optionally, the first operation is performed by the third processing tile based on the updated first set of data after the updated first set of data is stored in a reserved segment of the third OCM.

It is appreciated that the OCM for each processing tile may be partitioned and segmented. Each segment may store a data set associated with one ML model, e.g., weights and bias constant data. It is appreciated that at least one segment may be reserved to receive updated data for an already stored data or to receive data associated with a new ML model. In some embodiments, an outdated ML model data may be purged once an updated data or a new ML model data is received by the reserved segment.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system, comprising:

a first processing tile comprising at least a first processing element and a first on-chip memory (OCM), wherein the first OCM is partitioned and a first partition of the first OCM is configured to receive and locally store a first set of data that includes weights and bias constant data associated with a first machine learning (ML) model and wherein the first set of data is associated with a first operation of the first ML model, and wherein the first partition of the first OCM is further configured to receive and locally store a second set of data that includes weights and bias constant data associated with a second ML model and wherein the second set of data is associated with a second operation of the second ML model, wherein the first set of data is accessed by the first processing element for processing the first operation, and wherein the second set of data is accessed by the first processing element for processing the second operation; and a second processing tile comprising at least a second processing element and a second OCM that is partitioned, wherein a first partition of the second OCM is configured to receive and locally store a third set of data that includes weights and bias constant data associated with a third ML model and wherein the third set of data is associated with a third operation of the third ML model, wherein the third set of data is accessed by the second processing element for processing the third operation, wherein a fourth set of data includes weights and bias constant data associated with a fourth ML model and wherein the fourth set of data is associated with a fourth operation of the fourth ML model and is being received by the first processing tile as the first processing element is processing the first operation based on the first set of data and further as the second processing element is processing the third operation based on the third set of data.

2. The system of claim 1, wherein the first partition of the first OCM is segmented into a first segment, a second segment, and a reserved segment, wherein the first segment is configured to store the first set of data, wherein the second segment is configured to store the second set of data, and wherein the reserved segment is configured to store the fourth set of data.

3. The system of claim 1, wherein the fourth set of data is an updated data for the second set of data.

4. The system of claim 3, wherein operation of the first processing element processing the second operation based on the second set of data is halted as the fourth set of data is being received, and wherein the first processing element processing the first operation based on the first set of data is unaffected as the fourth set of data is being received by the first processing tile and wherein the second processing element processing the third operation based on the third set of data is unaffected as the fourth set of data is being received by the first processing tile.

5. The system of claim 3, wherein the second set of data stored in the second segment of the first OCM is purged after the fourth set of data is stored in the reserved segment.

6. The system of claim 5, wherein the second segment of the first OCM is designated as a new reserved segment.

7. The system of claim 3, wherein the second segment of the first partition of the first OCM is deactivated as the fourth set of data is being received by the first processing tile.

8. The system of claim 7, wherein deactivating the second segment of the first partition of the first OCM causes the first processing element to halt operation on the second set of data while operation of the first processing element with respect to other data sets remains unaffected.

9. The system of claim 1, wherein the first set of data is received from a double data rate (DDR) memory.

10. The system of claim 1, wherein the second OCM also receives the first set of data associated with the first operation, and wherein the second processing element is configured to process the first operation based on the first set of data as the fourth set of data is being received by the first processing tile.

11. The system of claim 1, further comprising a sideband interface configured to receive the fourth set of data and store the fourth set of data before transmitting the fourth set of data to the reserved segment of the first OCM for local storage.

12. The system of claim 1, wherein the second OCM also receives the second set of data associated with the first operation, and wherein the second processing element is configured to process the second operation based on the second set of data, wherein operation of the second processing element processing the second operation based on the second set of data is halted as the fourth set of data is being received, and wherein the second processing element processing the third operation based on the third set of data is unaffected as the fourth set of data is being received by the second processing tile.

13. A method comprising:

receiving a first and a second set of data at a first and a second processing tiles respectively, wherein the first set of data and the second set of data each includes weights and bias constant data associated with a first machine learning (ML) model and a second ML model respectively, and wherein the first set of data is associated with a first operation of the first ML model and wherein the second set of data is associated with a second operation of the second ML model;

storing the first and the second set of data in a first partition of a first on-chip memory (OCM) of the first processing tile;

storing the first and the second set of data in a first partition of a second OCM of the second processing tile;

performing the first operation based on the first set of data, stored in the first OCM, by the first processing tile;

performing the second operation based on the second set of data, stored in the first OCM, by the first processing tile;

performing the first operation based on the first set of data, stored in the second OCM, by the second processing tile;

performing the second operation based on the second set of data, stored in the second OCM, by the second processing tile;

receiving an updated first set of data at the first processing tile or at the second processing tile, wherein the first operation based on the first set of data is halted by the first processing tile and the second processing tile while the second operation based on the second set of data is unaffected by the first processing tile and the second processing tile;

storing the updated first set of data in a reserved segment of the first OCM and in a reserved segment of the second OCM;

subsequent to storing the updated first set of data, performing the first operation on the updated first set of data by the first processing tile; and subsequent to storing the update first set of data, performing the first operation on the updated first set of data by the second processing tile.

14. The method of claim 13, further comprising:

prior to receiving the updated first data set, receiving the first set of data and a third set of data at a third processing tile;

prior to receiving the updated first data set, storing the first and the third set of data in a first partition of a third OCM of the third processing tile;

prior to receiving the updated first data set, performing the first operation and a third operation based on the first and the third set of data, stored in the third OCM, by the third processing tile;

receiving the updated first set of data at the first, or the second, or the third processing tile, wherein the first operation based on the first set of data is halted by the third processing tile and while the third operation based on the third set of data is unaffected by the third processing tile;

storing the updated first set of data in a reserved segment of the third OCM; and subsequent to storing the updated first set of data in the third OCM, performing the first operation on the updated first set of data by the third processing tile.

15. The method of claim 13, wherein the first partition of the first OCM is segmented into a first segment configured to store the first set of data, a second segment configured to store the second set of data, and the reserved segment configured to store the updated first set of data.

16. The method of claim 13, further comprising:

receiving a third set of data at the first processing tile while the first processing tile is performing one of the first operation or the second operation by accessing the first partition of the first OCM, wherein the first operation is based on the first set of data or the updated first set of data and wherein the second operation is based on the second set of data;

storing the third set of data in another reserved segment of the first OCM of the first processing tile;

subsequent to storing the third set of data, performing a third operation on the third set of data by the first processing tile.

17. The method of claim 13, further comprising purging the first set of data stored in the first partition of the first OCM after the updated first set of data is stored in the reserved segment of the first OCM.

18. The method of claim 17, further comprising designating a segment of the first partition of the first OCM that the first set of data was purged from as a new reserved segment.

19. The method of claim 13, further comprising segmenting the first partition of the first OCM into a first segment to store the first set of data set, a second segment to store the second set of data, and a third segment as the reserved segment.

20. The method of claim 19, further comprising deactivating the first segment of the first OCM as the updated first set of data is being received by the first processing tile.

21. The method of claim 13, wherein the first set of data is received from a double data rate (DDR) memory.

22. A system comprising:

a means for receiving a first and a second set of data at a first and a second processing tiles respectively, wherein the first set of data and the second set of data each includes weights and bias constant data associated with a first machine learning (ML) model and a second ML model respectively, and wherein the first set of data is associated with a first operation of the first ML model and wherein the second set of data is associated with a second operation of the second ML model;

a means for storing the first and the second set of data in a first partition of a first on-chip memory (OCM) of the first processing tile;

a means for storing the first and the second set of data in a first partition of a second OCM of the second processing tile;

a means for performing the first operation based on the first set of data, stored in the first OCM, by the first processing tile;

a means for performing the second operation based on the second set of data, stored in the first OCM, by the first processing tile;

a means for performing the first operation based on the first set of data, stored in the second OCM, by the second processing tile;

a means for performing the second operation based on the second set of data, stored in the second OCM, by the second processing tile;

a means for receiving an updated first set of data at the first processing tile or at the second processing tile, wherein the first operation based on the first set of data is halted by the first processing tile and the second processing tile while the second operation based on the second set of data is unaffected by the first processing tile and the second processing tile;

a means for storing the updated first set of data in a reserved segment of the first OCM and in a reserved segment of the second OCM;

a means for performing the first operation on the updated first set of data by the first processing tile subsequent to storing the updated first set of data; and a means for performing the first operation on the updated first set of data by the second processing tile subsequent to storing the updated first set of data.

23. A system, comprising:

a processing tile comprising:

at least a first processing element; and an on-chip memory (OCM) that is partitioned, and wherein a partition of the OCM is configured to receive and locally store a first set of data that includes weights and bias constant data associated with a first machine learning (ML) model and wherein the first set of data is associated with a first operation of the first ML model, and wherein the partition of the OCM is further configured to received and locally store a second set of data that includes weights and bias constant data associated with a second ML model and wherein the second set of data is associated with a second operation of the second ML model, wherein the first set of data is accessed by the first processing element for processing the first operation, and wherein the second set of data is accessed by the first processing element for processing the second operation, wherein a third set of data that includes weights and bias constant data associated with a third ML model is being received by the processing tile as the first processing element is processing the first operation based on the first set of data.

\*  \*  \*  \*  \*